(12) United States Patent
Kim

(10) Patent No.: US 7,079,135 B2
(45) Date of Patent: Jul. 18, 2006

(54) METHOD OF WAVELETS-BASED MULTIRESOLUTION REPRESENTATION OF THREE-DIMENSIONAL IMAGE OBJECT

(75) Inventor: Yun-sang Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 447 days.

(21) Appl. No.: 10/264,344

(22) Filed: Oct. 4, 2002

(65) Prior Publication Data

US 2003/0169253 A1 Sep. 11, 2003

(30) Foreign Application Priority Data

Mar. 7, 2002 (KR) ........................................ 2002-12210

(51) Int. Cl.
*G06T 17/00* (2006.01)

(52) U.S. Cl. ...................................................... 345/420

(58) Field of Classification Search ............ 375/240.19; 345/419

See application file for complete search history.

(56) References Cited

U.S. PATENT DOCUMENTS 6,405,151 B1 * 6/2002 Fujii et al. .................. 702/155
6,688,886 B1 * 2/2004 Hughes et al. ................ 433/24

OTHER PUBLICATIONS

"Multiresolution Analysis of Surfaces of Arbitrary Topological Type", ACM Transactions on Graphics, vol. 16, Issue 1 (Jan. 1997), ISSN:0730–0301.*
"Multiresolution Analysis of Arbitrary Meshes", Proceedings of the 22nd annual conference on computer graphics and interactive techniques, 1995, ISBN:0–89791–701–4.*
"Local Wavelets Decomposition for 3–D Surfaces", IEEE, 1999, 0–7803–5467–2/99.*
"Harmonic Maps and Their Applications in Surface Matching", IEEE, 1999, 0–7695–0149–4/99.*

* cited by examiner

*Primary Examiner*—Jeffery Brier
*Assistant Examiner*—Jon Hadidi
(74) *Attorney, Agent, or Firm*—Staas & Halsey LLP

(57) ABSTRACT

Method of wavelets-based multiresolution representation of a 3D image object. A center of an original 3D mesh image is set as an original of a new coordinate system, and respective coordinates of the original 3D mesh image is converted to the new coordinate system. After the coordinate conversion, the 3D mesh image is divided into a plurality of local meshes, of which boundary and inner coordinates are mapped. Next, a division level for the basis meshes is determined, and the basis meshes are divided accordingly. A parameter for local meshes divided from the basis meshes is determined. By a composition of boundaries of the reconstructed local meshes, the original 3D image object can be converted into an object to which wavelets can be applied, and as a result, the converted object can be represented at various resolutions with coefficients.

7 Claims, 13 Drawing Sheets

LOCAL MESHES
MATCHED
WITH 2D MESHES

DETERMINING
INNER & BOUNDARY
PARAMETERS

BASIS MESHES DIVIDED
WITH VARIOUS DIVISION
LEVELS & PROJECTED
TO 2D SPACE

ORIGINAL LEFT LUNG MESHES

RECONSTRUCTED LEFT LUNG
MESHES APPLICABLE WITH WAVELETS
(AT RESOLUTIONS 4 & 5)

LEFT LUNG MESHES AT
RESOLUTION 4

LEFT LUNG MESHES AT
RESOLUTION 3

LEFT LUNG MESHES AT
RESOLUTION 2

LEFT LUNG MESHES AT
RESOLUTION 1

LEFT LUNG MESHES AT
RESOLUTION 0

ORIGINAL HEART
MESHES

RECONSTRUCTED HEART
MESHES APPLICABLE WITH
WAVELETS
(AT RESOLUTIONS 4 & 5)

HEART MESHES AT
RESOLUTION 4

HEART MESHES AT
RESOLUTION 3

HEART MESHES AT
RESOLUTION 2

METHOD OF WAVELETS-BASED MULTIRESOLUTION REPRESENTATION OF THREE-DIMENSIONAL IMAGE OBJECT

BACKGROUND OF THE INVENTION

1. Field of the Invention

The present invention generally relates to a wavelets-based multiresolution representation of a 3D image object, and more particularly, to a wavelets-based multiresolution representation of a 3D image object, which is capable of compressing and storing the 3D image object, and gradually transmitting and effectively representing the 3D image, by rearranging 3D meshes in an irregular arrangement for an application of wavelets method.

2. Description of the Prior Art

Explosion of Internet use, stunning advancement of network field and introduction of 3D image equipments have brought 3D image objects in the spotlight of the industrial field. The problem of using such 3D image object is that it consumes a considerable amount of capacity. The 3D image object also causes many loads for transmission. Further, displaying the 3D image object in display devices is performed at a quite slow speed, and thus it consumes a lengthy time. A wavelets-based multiresolution representation of 3D image object can solve the above problems.

In order to express 3D image object in 3D space at multiresolutions by using wavelet scheme, a basis function has to be defined first. The basis function is expressed with a scaling function $\Phi^j(x)$ and a wavelet $\Psi^j(x)$ as follows:

$$\Phi^j(x) = [\phi_0^j(x), \ldots, \phi_{m^j-1}^j(x)] \quad \text{[Mathematical expression 1]}$$

where, $\phi_i^j(x)$ has a value '1' in the coordinate i of the 3D mesh at a resolution (j), and has a value '0' in the other coordinates. The wavelet is expressed by $$\Psi_i^j(x) = \phi_{2i+1}^{j+1},$$

and determined depending on the scaling function $\Phi^j(x)$. In such functions, there are two matrices according to the multiresolution principle, satisfying the following relation:

$$[\Phi^{j-1} | \Psi^{j-1}] = \Phi^j[P^j | Q^j] \quad \text{[Mathematical expression 2]}$$

Also, by the filter bank algorithm, the following equation is obtained.

$$[\Phi^{j-1}(x) | \Psi^{j-1}(x)]\begin{bmatrix} A^j \\ B^j \end{bmatrix} = \Phi^j(x) \quad \text{[Mathematical expression 3]}$$

Based on the mathematical expressions 2 and 3, relation of the analysis filters $A^j$, $B^j$ and synthesis filter $P^j$, $Q^j$ is expressed by, $$[P^j | Q^j]^{-1} = \begin{bmatrix} A^j \\ B^j \end{bmatrix} \quad \text{[Mathematical expression 4]}$$

In order to prove orthogonal relation between the basis functions and construct wavelets in 3D space, inner products of the functions have to be newly defined. Lounsbery functions f and g have inner products that can be expressed by the following equation:

$$<f, g> = \sum_{t \in \Delta(M^0)} \frac{1}{\text{Area}(\tau)} \int_{X \in \tau} f(x)g(x)\,dx \quad \text{[Mathematical expression 5]}$$

where, $\Delta(M^0)$ is a group of triangles constituting original meshes M, and $\tau$ indicates a signal triangle constituting $M^0$. This definition starts from the fact that all the triangles of the 3D meshes have equal areas. The following interrelation can be derived from the mathematical expressions 2 and 5.

$$I^j = (P^{j+1})^T I^{j+1} P^{j+1} \quad \text{[Mathematical expression 6]}$$

where, $I^j$ is an inner product between two basis functions at a resolution j.

Surface subdivision of 3D image object surface can be performed with the application of wavelets scheme. While subdividing 3D meshes in 1:4 ratio using the functions defined for multiresolution representation in 3D space, filters that are indicated by matrices are generated. FIG. 1 is a view showing such interrelation. Referring to FIG. 1, each triangle is split into 4 divisions sequentially. Exponents of value M 0, 1, 2 indicate times of split, while the exponents of value Q 1, 2 indicate synthesis filters from each of the split stages.

Initially, the 3D image meshes are arranged in irregular coordinates. For example, one coordinate is connected to four triangles, lines and coordinates, while another coordinate is connected to the two triangle, three lines and coordinates. These meshes cannot be represented at wavelets-based multiresolution representation, unless they are rearranged in a regular pattern. The 'remeshing' algorithm enables the use of wavelet scheme by rearranging the coordinates of the meshes of such irregular arrangement.

By the 'remeshing' algorithm based on a mapping, 3D image data are converted into an image in 2D space, reconstructed into a new image of certain regularity that can be applied with the wavelet scheme by parameterization, and then retransformed into an image of 3D space. Such image enables the multiresolution image representation.

Eck proposed remeshing algorithm based on harmonic mapping. The harmonic mapping provides mathematical tools that enable the conversion into 2D image with a maximum distortion of the 3D image surface.

When there is b: $D_b \rightarrow P_b$ that converts bounds of the 3D image patches into a 2D convex image, h: $D \rightarrow P$, a harmonic map that satisfies the function b is found. A solution can be obtained by minimizing the following energy function of the harmonic map:

$$E(h) = \frac{1}{2} \sum_{(i,j) \in \text{Edges}(D)} K_{ij} \|h(v_i) - h(v_j)\|^2 \quad \text{[Mathematical expression 7]}$$

where, $h(v_i)$, $h(v_j)$ are coordinates of original 3D image (D), $v_i, v_j$ are coordinates of 2D image obtained through harmonic map, and $K_{ij}$ is a spring constant disposed along the edge of the image D.

However, the methods proposed by Lounsbery or Eck are based on the condition that all the triangle constituting the 3D image meshes have the equal areas. Accordingly, Lounsbery or Eck cannot effectively express the areas that are geometrically complex or have severe convex. Further, the Eck's remeshing takes considerable time to obtain the patches of given meshes. It is also problematic as several steps of parameterization need to be taken.

SUMMARY OF THE INVENTION

Accordingly, it is an object of the present invention to provide a wavelets-based multiresolution representation for expressing a 3D image object, capable of effectively storing an original 3D image object, efficiently transmitting the data through a network, variously expressing images, and reducing processing time.

BRIEF DESCRIPTION OF THE DRAWINGS

The above-mentioned object and the feature of the present invention will be more apparent by describing the preferred embodiment of the present invention by referring to the appended drawing, in which.

DETAILED DESCRIPTION OF THE PREFERRED EMBODIMENT

The method of wavelets-based multiresolution representation of 3D image object according to the present invention will be described below.

Figure 1:
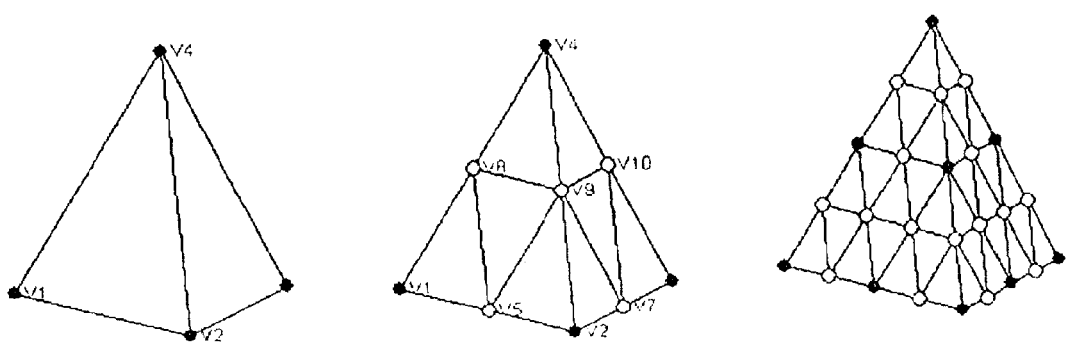
FIG. 1 is a view showing a pyramid split in a 3D space at a regular ratio.
Figure 2:
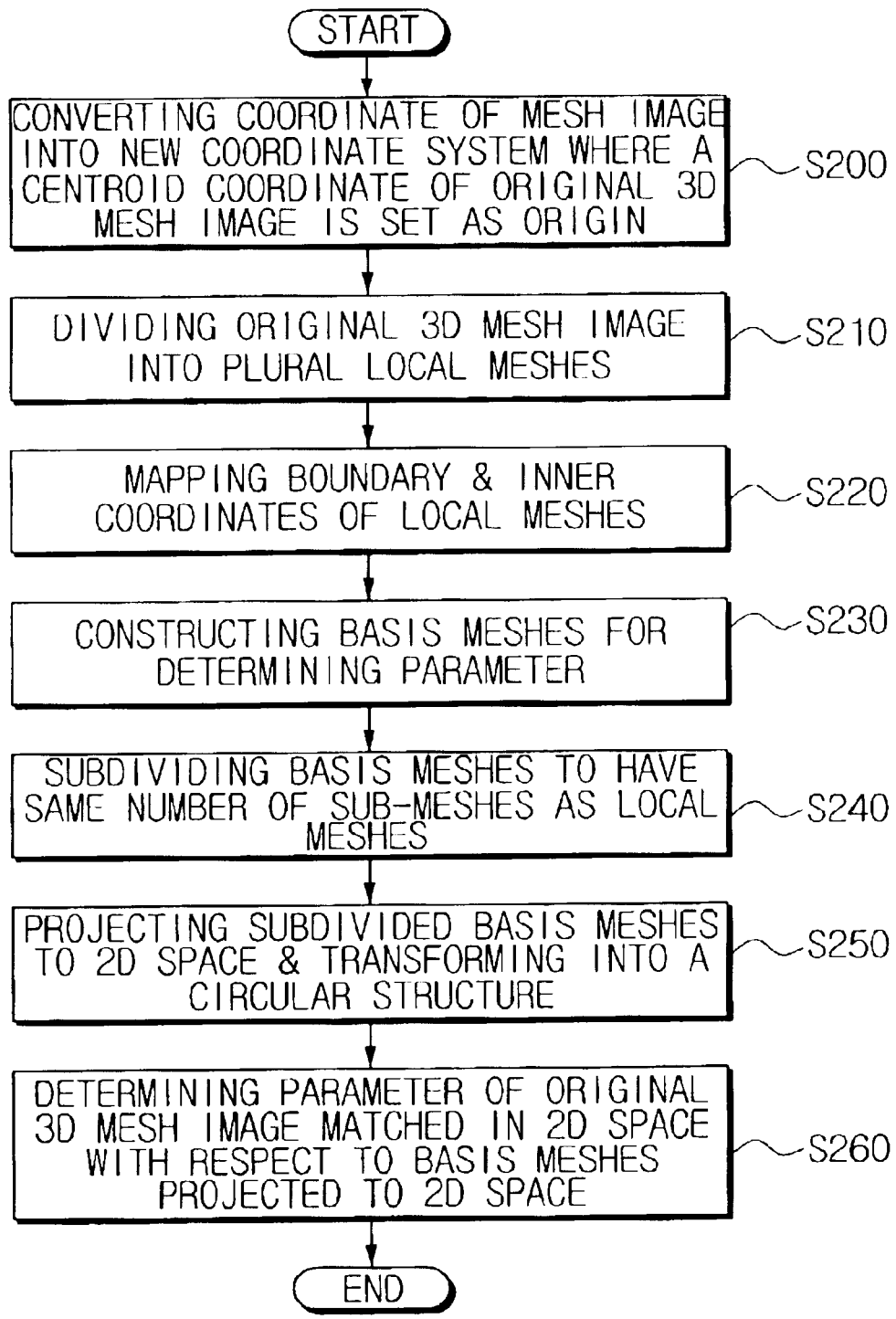
FIG. 2 is a flowchart showing the process of expressing a 3D image object by a wavelets-based multiresolution representation according to a preferred embodiment of the present invention.

FIG. 2 is a flowchart showing the process of expressing a 3D image object by a wavelets-based multiresolution representation according to a preferred embodiment of the present invention.

Figure 3:
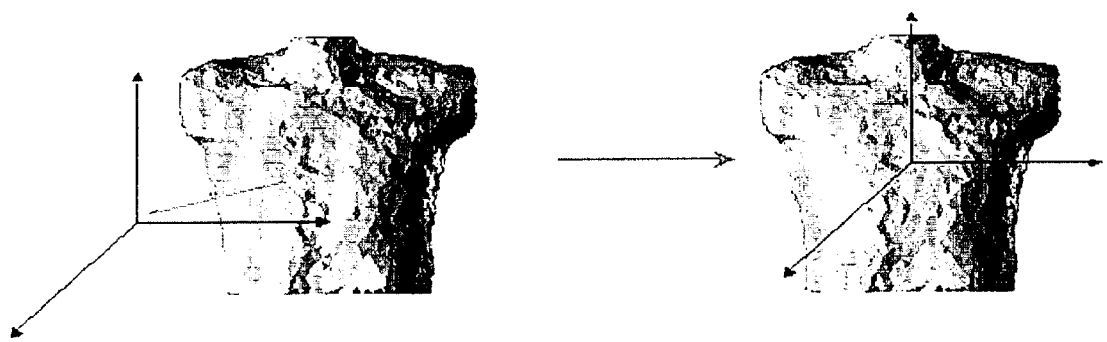
FIG. 3 is a view showing an original 3D mesh image M and a 3D mesh image M' of carried coordinate.

Referring to FIG. 2, a centroid coordinate of the original 3D mesh image M is evaluated, and the coordinate of the original 3D mesh image M is changed to a new coordinates system with the centroid coordinate as the origin (step S200). FIG. 3 shows the original 3D mesh image, and a 3D mesh image M' of changed coordinate. Next, the mesh image M' is partitioned into two local meshes M1 and M2, in the pattern approximate to a triangle (step S210). Although the mesh image M' is partitioned into two meshes in this embodiment, it should not be considered as limiting. Accordingly, the mesh image M' can be partitioned into more than two.

Then the bound coordinates of the local meshes M1, M2 and the inner coordinates are mapped (step S220). Based on conformal mapping that performs conversion into 2D space with the maintained rate of length and angle of two lines, the following function 8 is applied in the coordinates in the neighborhood of the centroid coordinates of the local meshes M1, M2.

$$f_i(v_i) = 0, \quad f_i(v_j) = r_j^a e^{i\theta_j a} \qquad \text{[Mathematical expression 8]}$$

where, $v_i$ is the centroid coordinate of the local mesh, and $v_j$ is the coordinate of boundary region surrounding $v_i$.

The mapping of the boundary region of the local meshes is derived from the following expressions:

$$r_j = \|v_i - v_j\|, \theta_j = \sum_{m=1}^{j} L(v_{m+1}, v_i, v_m), a = \frac{2\pi}{\theta_k} \qquad \text{[Mathematical expression 9]}$$

where, $\theta_k$ is a grand total of the interior angles formed when $v_j$ is connected with $v_i$, respectively.

Figure 4:
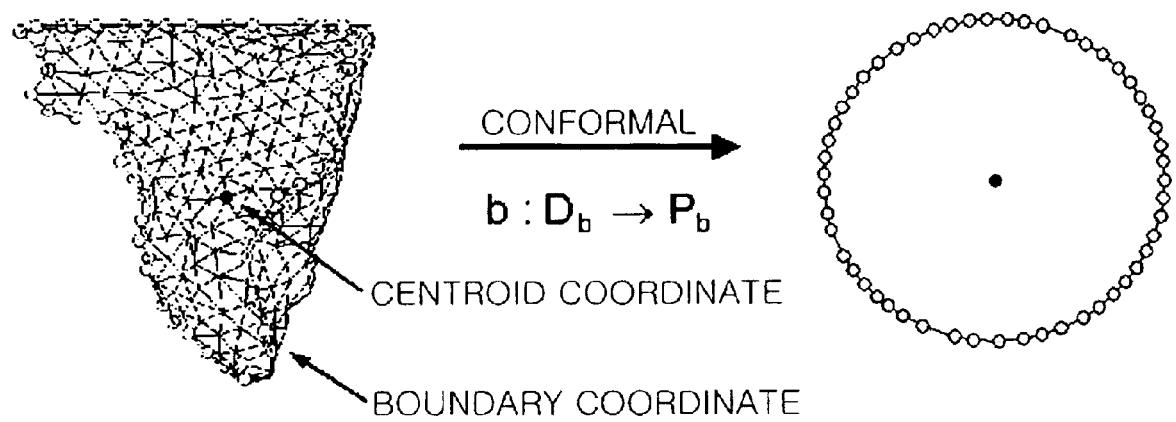
FIG. 4 is a view showing a local meshes before the mapping, and a result of conformal mapping.

FIG. 4 shows the original local mesh before the mapping and the mapping result after the conformal mapping.

Mapping of inner coordinates can be obtained by minimizing the above energy function 7. That is, with the respective edges regarded as spring, the mapping that could minimize the energy of the edges can be obtained as follows:

$$\frac{\partial E(h)}{\partial E(v_i)} = \sum_{i=1}^{n} k_{ij}(h(v_i), h(v_j)) = 0 \qquad \text{[Mathematical expression 10]}$$

where, $h(v_i)$, $h(v_j)$ are the coordinates of 2-dimensional images that are obtained through the harmonic map of the coordinates $v_i$, $v_j$ of the initial 3-dimensional image D, and $k_{ij}$ is a spring constants existing along the edge of the initial 3-dimensional image D.

For further information about the above expression 10, readers are advised to refer to the paper, Messer. D. Zhang and M. Hebert, *"Harmonic maps and their application in surface"*, 1999, IEEE conference on computer vision and pattern recognition.

Figure 5A:
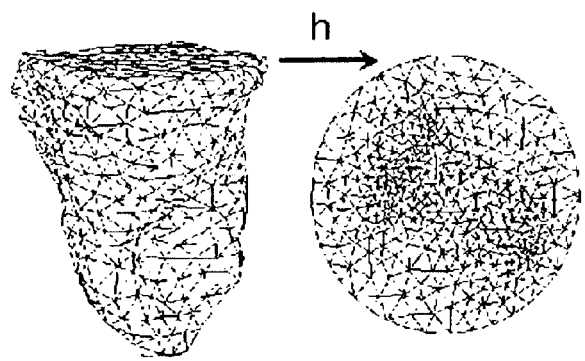
FIGS. 5A and 5B are views showing the result of harmonic mapping on the mesh images of heart and lung, respectively.
Figure 5B:
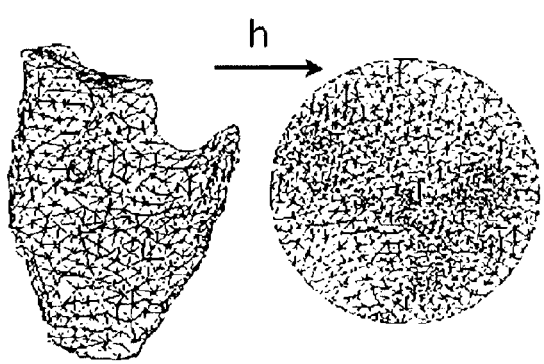

FIGS. 5A and 5B show the result of harmonic mapping on the mesh images that are derived from the above-described mapping with respect to the meshes of heart and lung. As shown in FIGS. 5A and 5B, a round image having divided regions is obtained after the mapping on the boundary coordinates and inner coordinates. The round image has the same connectivity as M of the 3D mesh image.

Next, a basis mesh is constructed for deciding parameters (step S230). The basis mesh is constructed to an octahedron. For the purpose of multiresolution modeling, the mesh needs to have subdivision connectivity. Most of the times, as the meshes do not have the subdivision connectivity, a remeshing process is required to convert the original meshes to have subdivision connectivity. In other words, the 'remeshing' process samples the original meshes by using the basis meshes having subdivision connectivity. Parameter determination is for creating the relation of the original meshes and the sampling domain meshes.

The basis meshes are divided into sub-meshes by the number identical to the number of local meshes (step S240). The level of dividing on the basis meshes can be decided by calculating the density of the coordinates scattered around the local convex of original coordinates and the triangles of the divided basis meshes. It is preferable that the dividing level be adjusted partially to make sure there is no isolated or divided triangle. Such dividing process on the basis meshes usually includes the local division and a general division. The local division decides the level of dividing with respect to a certain part of the area, while the general division decides the level of dividing with respect to the entire area. After the division, the basis meshes are projected to the 2D space, and then transformed to form a circle (step S250).

Figure 6:
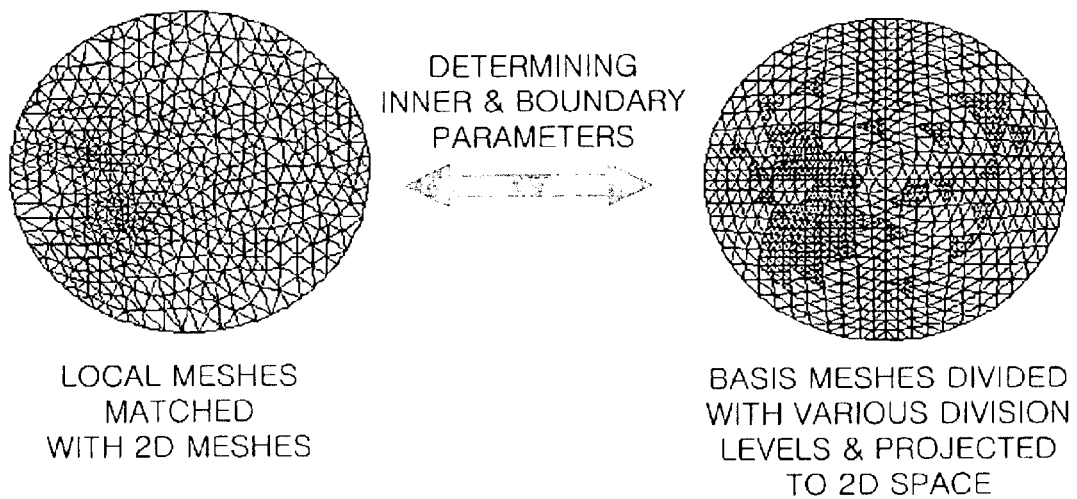
FIG. 6 is a view showing a 3D mesh image mapped in the 2D meshes, and a basis mesh split into different levels and projected to 2D space.
Figure 7A:
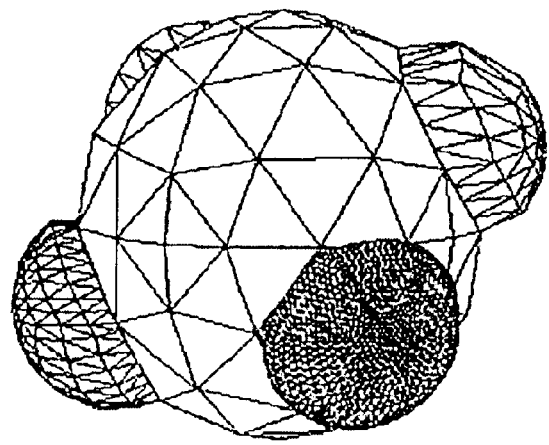
FIGS. 7A through 7D are views showing the meshes of different split levels expressed by wavelets-based multiresolution representation.
Figure 7B:
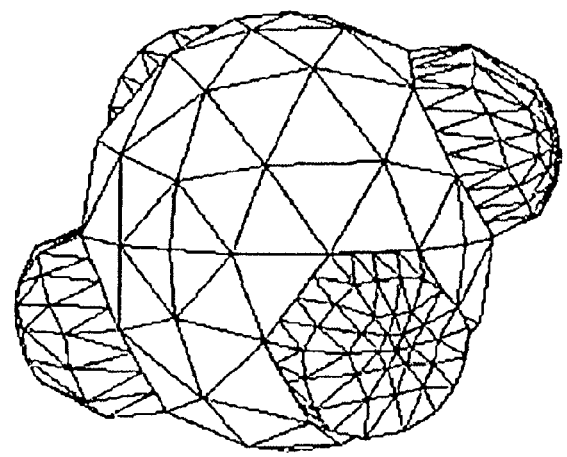
Figure 7C:
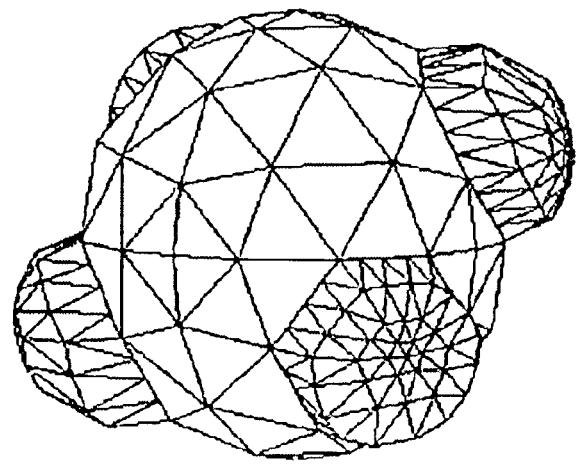
Figure 7D:
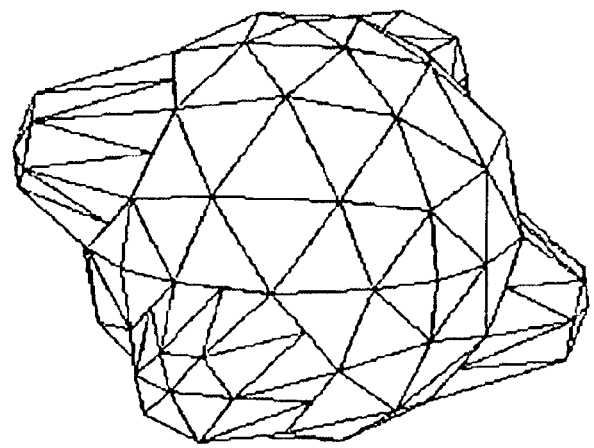
Figure 8A:
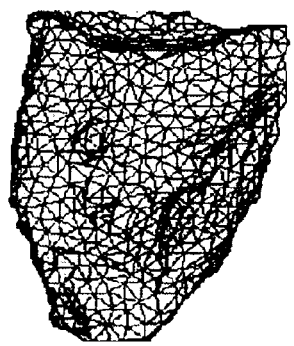
FIGS. 8A through 8G, and FIGS. 9A through 9E are views showing the initial image and the images obtained after applying the wavelets-based multiresolution representation according to the present invention for 3D image object.
Figure 8B:
Figure 8C:
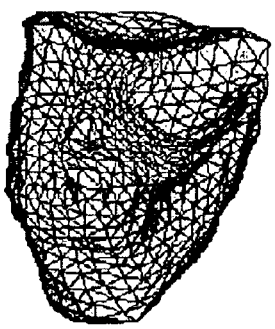
Figure 8D:
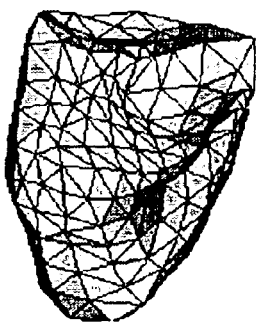
Figure 8E:
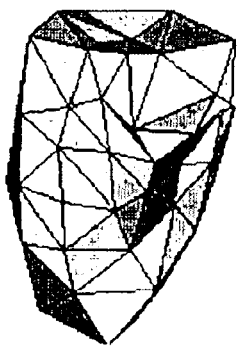
Figure 8F:
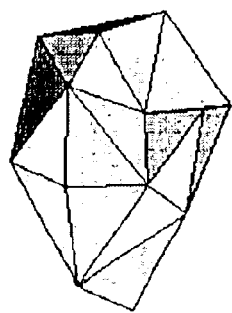
Figure 8G:
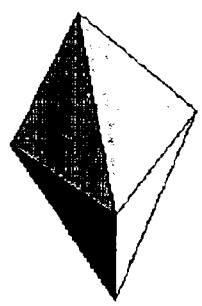
Figure 9A:
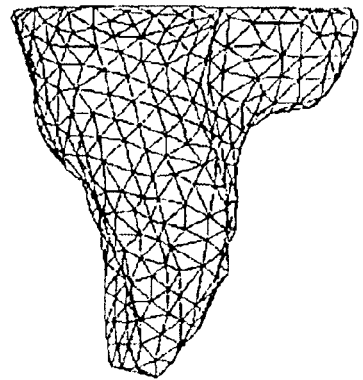
Figure 9B:
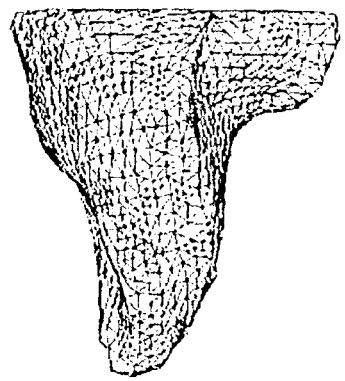
Figure 9C:
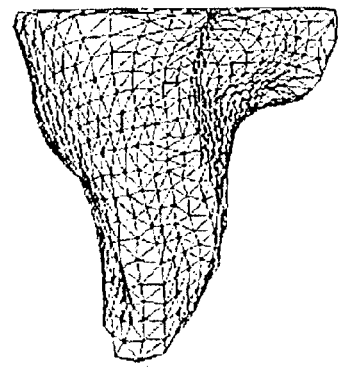
Figure 9D:
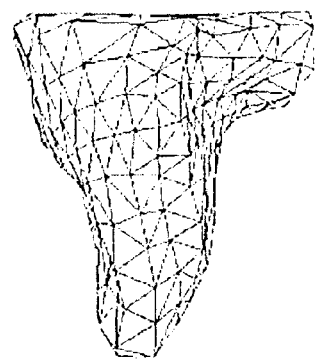
Figure 9E:
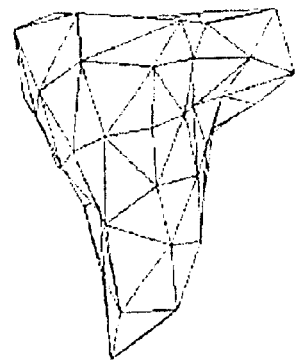

With respect to the basis meshes, which are divided at various levels and projected to the 2D space, a parameter of the local meshes mapped in the 2D space is determined (step S260). The parameter is obtained by calculating the centroid coordinate of the respective local meshes. FIG. 6 shows the local meshes mapped into the 2D meshes, and the basis meshes divided at various levels and projected to the 2D space.

It is possible to combine meshes that are rearranged at different sub-levels by deciding the boundary parameter. In other words, the 3D image constructed with the final meshes obtained from the above-described processes can be expressed at multiresolutions through decomposition and composition filters that are obtained from the basis meshes divided at various levels.

For the areas that are particularly complex or convex in geometry, it is preferable to subdivide these area into more smaller pieces for representation. This is enabled by the inner products of the two functions of different resolutions in the filter determining process. More specifically, by applying the following equation to the process of obtaining the inner products (I) for the determination of the filters, the inner products between the two functions of different resolutions can be achieved:

$$I_L^j(m,n) = \sum_{t=1}^{m=1} I_L^j(m,i) + \sum_{i=m+1}^{n} I_L^j(m,i).$$ [Mathematical expression 11]

Here, the expression 11 expresses the relation in which each element on the diagonal is the sum of the other elements in the same row.

Meanwhile, wavelets in orthogonal relation can be obtained by the following equation:

$$\Psi_{LL\_orth}^j(x) = \Psi_L^j(x) - \Phi_L^j(x)a_L^j$$ [Mathematical expression 12]

Again, for more detailed explanation about the expression 12, readers are advised to refer to the paper, Messer. D. Zhang and M. Hebert, *"Harmonic maps and their application in surface"*, 1999, IEEE conference on computer vision and pattern recognition.

FIGS. 7A through 7D show the representations at multiresolutions using wavelets of the meshes of various levels of division, which are obtained by the above-described processes. Meanwhile, FIGS. 8A through 8G and FIGS. 9A through 9E show the operation by the method of wavelets-based multiresolution representation of 3D image object with respect to the originally-given image according to the present invention.

According to the method of wavelets-based multiresolution representation of 3D image object according to the present invention, the originally-given 3D object is reconstructed into a new object to which wavelets can be applied, and thus can be represented at various resolutions with the coefficients. By coding the 3D object at a lowest resolution together with the coefficient obtained in the intermediate process, the image can be stored with the 5 times better compression efficiency, and also can be transmitted efficiently. In addition, gradual representation is possible through the coefficient from the lowest resolution, and editing is also available at the desired resolution. Further, the present invention can be applied to the standardization of the mesh representation in the 3D catalogues, and MPEG motion picture compression technology.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A method of wavelets-based multiresolution representation of a 3D image object, comprising:

converting a coordinates of a 3D mesh image;

dividing the 3D mesh image into a plurality of local meshes;

mapping a boundary coordinate and an inner coordinate of the local meshes;

subdividing basis meshes by determining a division level with respect to the basis meshes; and determining a parameter of the local meshes that are divided from the basis meshes, wherein the mapping operation comprises:

boundary mapping of converting the coordinates around the centroid coordinate and boundary of the local meshes to a 2D space with a maintained ratio of an angle and a length of a plurality of lines; and inner mapping of 4 mapping inner coordinates of the local meshes into a convex image by using a harmonic map.

2. The method of wavelets-based multiresolution representation of the 3D image object of claim 1, wherein the coordinate converting operation converts a centroid coordinate of the 3D mesh image to an origin of a coordinate system where the 3D mesh image is located.

3. The method of wavelets-based multiresolution representation of the 3D image object of claim 1, wherein the boundary mapping operation is performed by, $$f_i(v_i) = 0, \quad f_i(v_j) = r_j^a e^{i\angle_j a}$$

where, $v_i$ is the centroid coordinate of the local mesh, $v_j$ is the coordinate boundary region surrounding $v_i$, $r_j$ is the shortest average distance between the centroid coordinate and the boundary coordinate of the local meshes and satisfies the condition $$r_j = \|v_i - v_j\|, \text{ and } \theta_j = \sum_{m=1}^{i} L(v_{m+1}, v_i, v_m), \text{ and } a = \frac{2\pi}{\theta_k}.$$

4. The method of wavelets-based multiresolution representation of the 3D image object of claim 1, wherein the inner mapping operation is performed by, $$\frac{\partial E(h)}{\partial E(v_i)} = \sum_{i=1}^{n} k_{ij}(h(v_i), h(v_j)) = 0,$$

where, $v_j$ is the coordinate of boundary region surrounding $v_i$, $r_j$ is the shortest distance between the centroid coordinate and the boundary coordinate of the local meshes and satisfies the condition of $r_j = \|v_i - v_j\|$, and $\theta_j = \sigma < (v_m, v_i, v_m)$, and $a = 2\pi\theta_k$.

5. The method of wavelets-based multiresolution representation of the 3D image object of claim 1, wherein the basis mesh dividing operation divides the basis meshes, with determining the division level with respect to the basis meshes based on a convexity calculated from the respective coordinates of the local meshes and a density of the coordinates located in respective triangles of the divided basis meshes constructed of an octahedron.

6. The method of wavelets-based multiresolution representation of the 3D image object of claim 1,
wherein the basis mesh dividing operation comprises determining a filter with respect to the meshes at different resolution, and
the filter determining step determines the filter by obtaining inner products between the meshes of difference resolutions by, $$I_L^j(m, n) = \sum_{i=1}^{m-1} I_L^j(m, i) + \sum_{i=m+1}^{n} I_L^j(m, i).$$

7. The method of wavelets-based multiresolution representation of the 3D image object of claim 1, wherein the parameter determining operation calculates a centroid coordinate of the local meshes and determines the parameters of a boundary and interior of the local meshes, the local meshes being mapped in a 2D space with respect to the basis meshes that are subdivided at different division levels and projected to the 2D space.

* * * * *

UNITED STATES PATENT AND TRADEMARK OFFICE
CERTIFICATE OF CORRECTION

| | |
|---|---|
| PATENT NO. | : 7,079,135 B2 |
| APPLICATION NO. | : 10/264344 |
| DATED | : July 18, 2006 |
| INVENTOR(S) | : Yun-sang Kim |

Page 1 of 1

It is certified that error appears in the above-identified patent and that said Letters Patent is hereby corrected as shown below:

Column 6, Line 24, after "converting" delete "a".

Column 6, Line 40, after "of" delete "4".

Column 6, Line 56, after "coordinate" insert --of--.

Column 8, Line 4, change "step" to --operation--.

Signed and Sealed this

Second Day of January, 2007

JON W. DUDAS
*Director of the United States Patent and Trademark Office*